UNITED STATES PATENT OFFICE.

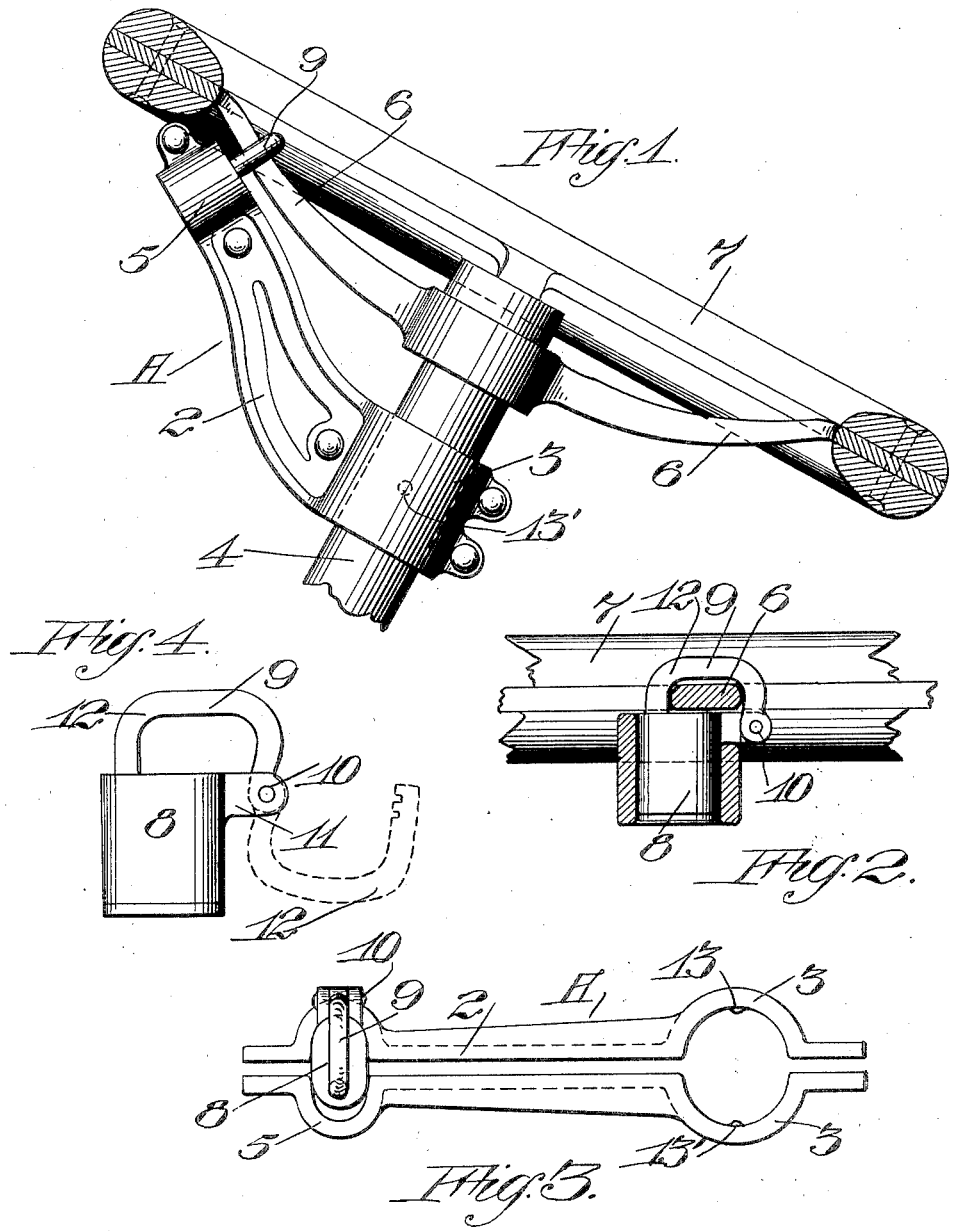

WALTER G. SACHS AND CHARLES W. LANDERS, OF SAN FRANCISCO, CALIFORNIA.

AUTOMOBILE-LOCK.

1,009,931.         Specification of Letters Patent.    Patented Nov. 28, 1911.

Application filed November 28, 1910. Serial No. 594,456.

*To all whom it may concern:*

Be it known that we, WALTER G. SACHS and CHARLES W. LANDERS, citizens of the United States, residing at San Francisco, in the county of San Francisco, and State of California, have invented new and useful Improvements in Automobile-Locks, of which the following is a specification.

This invention relates to locks and is particularly relevant to locks for automobiles.

The object of this invention is to provide a simple, inexpensive and easily applied lock for automobiles, and to provide a lock of such construction that it may be readily packed for shipment.

The invention consists of the parts and construction and combination of parts hereinafter more fully described and claimed, having reference to the accompanying drawings, in which—

Figure 1. is a side elevation of the improved lock as applied to the steering post of an automobile. Fig. 2 shows a section of the outer end of the lock containing arm and one of the spokes of the steering wheel, and an elevation of the lock in operative position. Fig. 3. is a plan view of the lock in supported position. Fig. 4. is a detail view showing the clasp of the lock in two positions.

In the present embodiment of our invention we employ a suitable bracket or arm A comprising supplementary curved sections 2 each having a concaved seat or hub portion 3 adapted to embrace the steering post supporting tube 4 of an automobile. The arm A is securely fastened thereon by means of bolts or rivets, and may also be soldered in place. The plates 2 are curved upwardly from the hub portion so that the outer end 5 of the assembled arm is in juxtaposition to the spokes 6 of the steering-wheel 7 of the automobile.

The end 5 of the arm A is so shaped as to form a socket to receive a suitable form of pad-lock or other appropriate device as 8, having hasp 9 so pivoted at 10 to the body of the lock 8 that when it is swung into the lock-body 8 it will embrace one of the spokes 6 of the hand-wheel and prevent the wheel from being turned. The curved members 2 forming the lock carrying bracket A are preferably formed with suitable lugs adjacent the hub and the socket portion 5 to receive fastening rivets or bolts, and the lock 8 is adapted to be seated in either one or the other of the sockets in the members 2 and permanently fastened therein by suitable means as soldering, riveting so that when the assembled arm is unbolted the lock 8 will be permanently retained in one of the plates, thus insuring that the locking device will always be in proper position and not liable to be lost from the bracket A.

Referring to Fig. 4 it will be noticed that the hasp 9 is pivoted at 10 in the slight projecting ear 11 formed on the lock 8, and that the hasp 9 is so curved at 12 as to insure the hasp embracing one of the spokes 6 when in a closed position. When the lock is opened and the hasp 9 turned outwardly about its pivot 10, the free end of the hasp will be entirely out of the path of movement of the spokes of the steering-wheel.

In operation the two independent members or plates 2, are placed against the body of the tube 4, which is embraced by the hub 3 and the upper projecting portion 5 of the bracket is so positioned in relation to the spokes of the wheel that when the hasp 9 of the lock is in the open position, the steering wheel may be freely turned without interference. When it is desired to lock the wheel against movement one of these spokes may be moved into position above the lock 8, and the hasp 9 thrown over the spoke so as to embrace it and positively lock it against movement until it is released by the person possessing the key suitable to the lock.

In order to prevent the bracket from any turning or longitudinal movement on the steering tube the hub portion is provided with small projections 13 and 13', and the steering tube being provided with corresponding socket portions will firmly lock the brackets on the tube.

Having thus described our invention, what we claim and desire to secure by Letters Patent is—

1. An automobile lock comprising a lock-supporting arm having a hub adapted to be secured concentric with a steering post said arm having a socket in its outer end, and a lock case fitting said socket and having a hasp to detachably lock a steering wheel to said arm.

2. An automobile lock comprising an arm fixed to a stationary portion of a steering member and having a socket in its outer end, and a lock the case of which is contained within said socket said lock having a movable member adapted to embrace a spoke of a steering wheel.

3. An automobile lock comprising a lock supporting arm adapted to be attached to a fixed part of a steering mechanism said arm being formed of two similar members placed side by side and each having curved seats at opposite ends, the seats at the outer end forming a socket, and a lock case fitting within said socket having a hasp to embrace the spokes of a steering wheel.

In testimony whereof we have hereunto set our hands in the presence of two subscribing witnesses.

WALTER G. SACHS.
CHARLES W. LANDERS.

Witnesses:
A. B. THOMPSON,
G. KAFKA.